Patented Dec. 31, 1929

1,741,877

UNITED STATES PATENT OFFICE

RUFUS H. PRITCHETT, OF RENSSELAER, NEW YORK, ASSIGNOR TO WINTHROP CHEMICAL COMPANY, INC., OF NEW YORK, N. Y., A CORPORATION OF NEW YORK

NEW PROCESS OF PREPARING PHENYL-OXALYL ACETIC-ACID ALKYL ESTERS

No Drawing.   Application filed January 19, 1929.   Serial No. 333,750.

My invention relates to a new process of preparing phenyl-oxalyl-acetic-acid-alkyl-esters of the general formula:

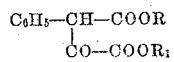

wherein R and $R_1$ represent alkyl radicals.

I have found that these compounds are obtainable in a comparatively simple manner by causing a phenyl-acetic-acid-alkylester to react in an alcoholic solution and in the presence of sodium-alcoholate with an oxalic acid dialkylester, and converting the sodium-phenyl-oxalyl-acetic-acid-alkylester thus obtained into the corresponding free phenyl oxalyl-acetic-acid-alkylester. It is essential that the first stage of my process is carried out with the complete exclusion of water.

When using, for instance, phenyl-acetic-acid-ethylester and oxalic acid-diethylester, the reaction occurs in the following two stages, which might be generally described by the following formulas:

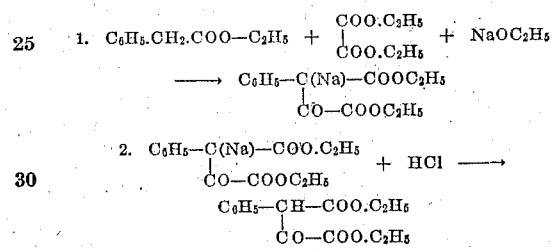

The only process which was hitherto known in the art for the preparation of phenyl-oxalyl-acetic-acid-alkylesters was that described by Wislicenus in "Berichte der deutschen chemischen Gesellschaft," vol. 20, pp. 591 and 592 and vol. 27, p. 1092. This process, in which sodium-dried ether is used as the reaction medium, requires the introduction of metallic sodium in the form of fine wire or ribbon into the dry ether and a heating of the reaction mixture for many hours.

I have now found that in this reaction the ether can be replaced by dry alcohol. In comparison with the hitherto known process my new process offers several advantages, as for instance lower expenses, simpler handling of the alcoholic solution in comparison with the handling of the ether solution, shorter time of reaction, absence of the danger of fire hazard and explosion and finally a better yield. With my new process I can easily obtain a yield of about 80 per cent of the theory of phenyl-malonic-acid-alkylester, whereas the process described by Wislicenus generally does not yield more than about 50–60 per cent of the theory.

In order to describe my invention more fully, I give the following example, all parts being by weight, the temperatures given in centigrades:

*Example.*—To 315 parts of dry ethyl alcohol are added 23 parts of metallic sodium. The sodium reacts with the alcohol, producing sodium-ethylate. When the sodium has completely reacted, the charge is cooled, and 146 parts of diethylester of oxalic acid and 164 parts of phenyl-acetic-acid-ethylester are added. The reaction mixture is agitated to produce a thorough mixing. After a short time, a certain amount of heat is developed, and the sodium-oxalyl-phenyl-acetic-acid-ethylester crystallizes in a semi-solid mass.

The charge is allowed to stand over night. The next morning the semi-solid mass is put into cold dilute muriatic acid, whereby the sodium-oxalyl-phenyl-acetic-acid-ethylester is converted into the free oxalyl-phenyl-acetic-acid-ethylester. This compound separates as a heavy oil and is readily removed from the water layer. The ester is then treated with fresh water in order to wash out any excess of acid that might be present.

The oxalyl-phenyl-acetic-acid-ethylester may be converted into phenyl-malonic-acid-ethylester by splitting off carbon monoxide and subsequent distillation.

I do not wish to limit myself to the exact proportions or details given in this example. For instance, I may proceed in the following way:

After the semi-solid mass has formed, a portion of the alcohol in the charge may be distilled off and the residue, when cold, converted into oxalyl-phenyl-acetic-acid-ethylester with cold dilute muriatic acid with little variation in the final results. The semi-solid mass may likewise be placed on a filter and the alcohol filtered off, leaving the solid sodium-oxalyl-phenyl-acetic-acid-ethylester. This product can be treated with cold dilute muriatic acid and converted into the oxalyl-phenyl-acetic-acid- ethylester.

I claim:

1. The process which comprises causing a phenyl-acetic-acid-alkylester to react with an oxalic-acid-dialkylester in the presence of sodium-alcoholate and dry alcohol.

2. The process which comprises causing a phenyl-acetic-acid-alkylester to react with an oxalic-acid-dialkylester in the presence of sodium-alcoholate and dry alcohol and treating the sodium-phenyl-oxalyl-acetic-acid-alkylester thus obtained with a free acid.

3. The process which comprises causing phenyl-acetic-acid-ethylester to act upon oxalic-acid-diethylester in the presence of sodium-ethylate and dry ethylalcohol.

4. The process which comprises causing phenyl-acetic-acid-ethylester to act upon oxalic-acid-diethylster in the presence of sodium-ethylate and dry ethylalcohol and treating the sodium-phenyl-oxalyl-acetic-acid ethylester thus obtained with a free acid.

5. The process which comprises causing oxalic-acid-diethylester to act upon phenyl-acetic-acid-ethylester in the presence of sodium-ethylate in about molecular proportions while using dry ethylalcohol as the reaction-medium.

6. The process which comprises causing oxalic-acid-diethylester to act upon phenyl-acetic-acid-ethylester in the presence of sodium-ethylate in about molecular proportions while using dry ethylalcohol as the reaction-medium and treating the sodium-oxalyl-phenyl-acetic-acid-ethylester with cold dilute acid.

In testimony whereof, I affix my signature.

RUFUS H. PRITCHETT.